(12) United States Patent
Chavrier et al.

(10) Patent No.: US 12,734,906 B2
(45) Date of Patent: Sep. 15, 2026

(54) VEHICLE EQUIPPED WITH AT LEAST ONE SOLAR PANEL AND A KINETIC ENERGY RECOVERY SYSTEM

(71) Applicant: VOLVO TRUCK CORPORATION, Gothenburg (SE)

(72) Inventors: Philemon Chavrier, Lyons (FR); Olivier Poussin, Lyons (FR); Cédric Mazaufroy, Genas (FR); Sebastien Pesenti, Saint Priest (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 268 days.

(21) Appl. No.: 18/630,401

(22) Filed: Apr. 9, 2024

(65) Prior Publication Data

US 2024/0343128 A1 Oct. 17, 2024

(30) Foreign Application Priority Data

Apr. 11, 2023 (EP) .................................... 23167366

(51) Int. Cl.
*B60L 8/00* (2006.01)
*B60K 1/00* (2006.01)
(Continued)

(52) U.S. Cl.
CPC ............ *B60L 15/2054* (2013.01); *B60K 1/00* (2013.01); *B60K 20/00* (2013.01); *B60L 8/003* (2013.01);
(Continued)

(58) Field of Classification Search
CPC .. B60L 15/2054; B60L 8/003; B60L 2210/10; B60L 50/40; B60K 1/00; B60K 20/00; H02S 10/40
See application file for complete search history.

(56) References Cited

U.S. PATENT DOCUMENTS

2005/0252696 A1 11/2005 Kaufman
2013/0222098 A1* 8/2013 Monson ................ H02K 53/00 335/306
(Continued)

FOREIGN PATENT DOCUMENTS

CN 201128379 Y * 10/2008
WO 2009086135 A2 7/2009
(Continued)

OTHER PUBLICATIONS

European Search Report in corresponding European Application No. 23167366.6 dated Sep. 14, 2023 (3 pages).

*Primary Examiner* — Edwin A Young
(74) *Attorney, Agent, or Firm* — Jeffri A. Kaminski; Venable LLP

(57) ABSTRACT

A vehicle includes a prime mover, such as an internal combustion engine, driving a transmission shaft, a kinetic energy recuperation system, including an electric machine fitted on the transmission shaft and a supercapacitor for recovering the braking energy delivered by the electric machine, at least one solar panel, that is connected to the electric machine and to the supercapacitor, and a controller that is configured to direct the energy captured by the solar panel(s) either to the electric machine or to the supercapacitor as a function of the torque demand on transmission shaft.

13 Claims, 3 Drawing Sheets

(51) Int. Cl.
*B60K 20/00* (2006.01)
*B60L 15/20* (2006.01)
*B60L 50/40* (2019.01)
*H02S 10/40* (2014.01)

(52) U.S. Cl.
CPC ........... *B60L 50/40* (2019.02); *B60L 2210/10* (2013.01); *H02S 10/40* (2014.12)

(56) References Cited

U.S. PATENT DOCUMENTS

| | | | | |
|---|---|---|---|---|
| 2013/0306389 | A1 | 11/2013 | Penev | |
| 2014/0228168 | A1 | 8/2014 | Kaufman et al. | |
| 2015/0266382 | A1* | 9/2015 | Penmetsa .................. | B60L 1/14<br>307/10.1 |
| 2023/0261545 | A1* | 8/2023 | Grayson ................... | H02J 7/90<br>320/109 |

FOREIGN PATENT DOCUMENTS

| | | | |
|---|---|---|---|
| WO | 2009086135 | A4 | 7/2009 |
| WO | 2009086135 | A3 | 9/2009 |
| WO | 2010019784 | A2 | 2/2010 |
| WO | 2010019784 | A3 | 5/2010 |

* cited by examiner

VEHICLE EQUIPPED WITH AT LEAST ONE SOLAR PANEL AND A KINETIC ENERGY RECOVERY SYSTEM

TECHNICAL FIELD

The disclosure relates generally to energy consumption reduction. In particular aspects, the disclosure relates to a vehicle equipped with at least one solar panel and a kinetic energy recovery system. The disclosure can be applied to any vehicle equipped with a drive shaft. This includes the trucks, certain utility vehicles, boats and some passenger cars, caravans, buses, and construction equipment, among other vehicle types. Although the disclosure may be described with respect to a truck, the disclosure is not restricted to any particular vehicle.

BACKGROUND

In the automotive industry, Kinetic Energy Recovery Systems (KERS) are now standard on all Hybrid Electric Vehicles (HEVs). The most known system consists of having an electric machine that can apply a resistive torque, thereby having the double advantage of acting as a brake and recovering the kinetic energy by storing it into a reservoir for later use under acceleration. Today, the reservoir to which it is referred to is most often a Lithium-ion battery, e.g. a 48V battery or 600 V battery depending on the degree of hybridization. In the end, this allows to reduce fuel consumption.

On trucks and utility vehicles, the KERS consists in an electric machine fitted on transmission shaft. The electric machine can produce a magnetic field that can slow down the rotation of transmission shaft or add an additional torque depending on the use case.

Also, vehicle manufacturers start installing solar panels on the roof of some vehicles. Today, these solar panels are mainly used to recharge a separate battery, called living battery, that is dedicated to supply all "living" apparatuses, such as refrigerator, TV, etc.

SUMMARY

According to a first aspect of the disclosure, a vehicle is provided, said vehicle comprising:

- a prime mover, such as an internal combustion engine, driving a transmission shaft,
- a kinetic energy recuperation system, including an electric machine fitted on the transmission shaft and a supercapacitor for recovering the braking energy delivered by the electric machine,
- at least one solar panel, that is connected to the electric machine and to the supercapacitor;
- a controller that is configured to direct the energy captured by the solar panel(s) either to the electric machine or to the supercapacitor as a function of the torque demand on transmission shaft.

The first aspect of the disclosure may seek to reduce fuel consumption. A technical benefit may include providing additional power to the electric motor using solar energy whenever positive torque is needed and offering another recharging solution for the supercapacitor whenever a null or negative torque is requested.

Optionally in some examples, including in at least one preferred example, the controller directs the energy of solar panel(s) to the electric machine, thereby operating as a motor, whenever torque demand is positive. A technical benefit may be that the electric machine receives, in addition to the energy generated by supercapacitor discharge, some power from solar panel(s), thereby reducing the torque to be delivered by prime mover and therefore fuel consumption.

Optionally in some examples, including in at least one preferred example, torque demand is defined either manually by the driver or automatically by Cruise Control.

Optionally in some examples, including in at least one preferred example, the controller directs the energy of solar panel(s) to the supercapacitor whenever torque demand is negative or null. A technical benefit may be that solar power can be used to recharge supercapacitor whenever deceleration is requested. Supercapacitor recharge is then quicker and can store a maximum/optimal amount of energy. Solar power is therefore never wasted.

Optionally in some examples, including in at least one preferred example, the vehicle further includes a DC/DC converter to adapt the output voltage of the solar panel(s) to the input voltage of the electric machine or supercapacitor.

Optionally in some examples, including in at least one preferred example, the electric machine operates as a generator whenever torque demand is null or negative, thereby storing energy inside the supercapacitor.

Optionally in some examples, including in at least one preferred example, the electric machine operates as a motor whenever torque demand is positive and energy is available inside supercapacitor.

Optionally in some examples, including in at least one preferred example, the prime mover takes over the electric machine whenever supercapacitor is empty.

Optionally in some examples, including in at least one preferred example, the prime mover is controlled to compensate for the electric machine in order to reach said torque demand, consisting of the addition of the torque delivered by the electric machine and the torque delivered by prime mover.

Optionally in some examples, including in at least one preferred example, the electric machine includes a stator portion fixed to the vehicle chassis and a rotor portion that is coaxially fitted around the transmission shaft. A technical benefit may be that the KERS can be fitted on basically any vehicle provided with a transmission shaft, thereby providing a simple way to convert a thermal vehicle into a Hybrid Electric Vehicle (HEV).

Optionally in some examples, including in at least one preferred example, the vehicle further comprises a gearbox arranged between prime mover and transmission shaft.

Optionally in some examples, including in at least one preferred example, the electric machine is a DC motor-generator, e.g. a Brushless DC motor-generator. A technical benefit may be that the electric machine is easy to control, efficient and robust.

Optionally, the transmission shaft is a propeller shaft extending from a gearbox to a differential of a rear wheel axle.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
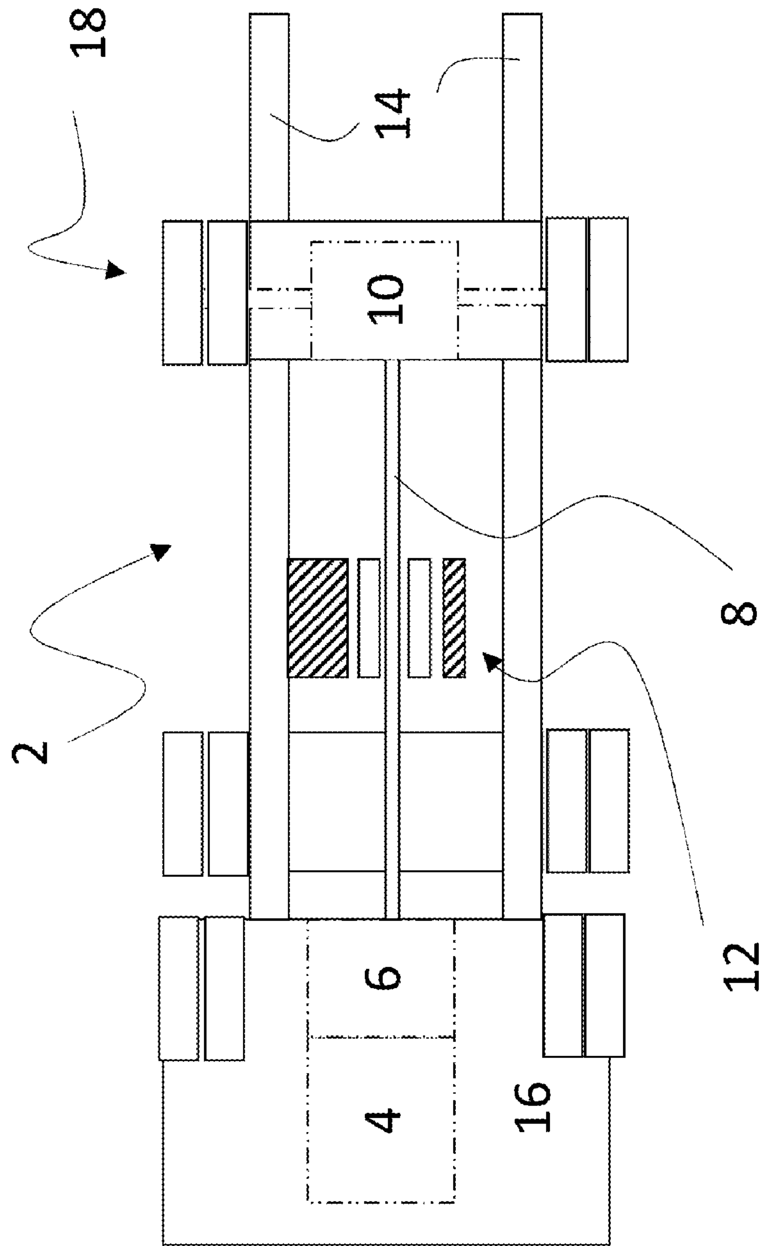
FIG. 1 is a top view of a heavy-duty vehicle, in particular a truck, according to a specific example.

FIG. 1 represents a heavy-duty vehicle 2, in particular a truck. The vehicle 2 comprises a prime mover 4 which, in the example, is an internal combustion engine. Although, in variant, the prime mover 4 could be an electric motor or a hydraulic motor. Therefore, the vehicle can be a Hybrid Electric Vehicle (HEV) or Battery Electric Vehicle (BEV). Hydraulic motors are used for moving construction equipment and other special vehicles.

In the example, the vehicle 2 includes a cab 16 mounted on a chassis 14 made of two longitudinal steel beams.

The prime mover 4 engages preferably with a gearbox 6 from which extends a transmission shaft 8 (a.k.a "drive shaft" or "propeller shaft"). In the embodiment shown, drive shaft 8 extends between the gearbox 6 and a differential 10 of an axle 18 which, in the specific example of FIG. 1 (and as it is usual on heavy-duty vehicles), is the rear axle. However, drive shaft could also engage front axle, meaning that the vehicle of the disclosure can be a Front Wheel Drive (FWD) vehicle (traction), a Rear Wheel Drive (RWD) vehicle (propulsion) or an All-Wheel Drive (AWD) Vehicle. In the last case, the vehicle includes a transfer box.

In other embodiments, transmission shaft could transmit a torque to a different organ, such as boat propeller. Gearbox is optional: Indeed, some BEVs do not include a gearbox. In such configuration, electric motor directly engages with drive shaft. Also, gearbox could be replaced by a Continuous Variable Transmission (CVT).

The vehicle 2 also includes a Kinetic Energy Recuperation System (KERS), including an electric machine 12 fitted on the transmission shaft and a supercapacitor 20 for recovering the braking energy delivered by the electric machine 12. In known manner, the supercapacitor 20 (SC) (a.k.a "ultracapacitor"), is a high-capacity capacitor, with a capacitance value much higher than other capacitors but with lower voltage limits. One advantage is that it can accept and deliver charge much faster than batteries and tolerates many more charge and discharge cycles than rechargeable batteries.

The whole point of having a supercapacitor instead of a Lithium-ion battery is that it can restitute a high level of power/energy within a very short time period. As a result, it is particularly useful for acceleration phases where fuel consumption is usually at its highest level. On the contrary, a battery is designed to deliver energy within a higher period of time, and therefore increase the vehicle's range.

In the example, the supercapacitor 20 is mainly used to provide bursts of power and/or to achieve faster initial acceleration, resulting in a fuel consumption reduction.

Preferably, the electric machine 12 to which it is referred to above is a Direct-Current (DC) reversible motor. By 'reversible', it is meant that it can be operated as a motor or a generator. For instance, this machine can be a Brushless DC motor (BLDC). In variant, the electric machine could also be an AC electric machine.

The electric machine 12 includes a rotor that is hollow and that is coaxially fitted around transmission shaft. The electric machine also includes a stator portion that is fixed to the vehicle chassis 14. As a result, the electric machine and supercapacitor can be added to any thermal vehicle equipped with a transmission shaft, which constitutes a good and cheap retrofit solution to convert/transform a thermal vehicle into a Hybrid Electric Vehicle (HEV).

Stator portion and rotor portion of the electric machine have been represented on FIG. 1 with different pattern fill. In known manner, stator portion is made of a plurality of windings. Rotor portion could be a permanent magnet to be fixed or fastened around drive shaft 8. In variant, it could also be made of windings.

FIG. 1 represents a 6 by 2 truck (6*2) in which the torque is only transmitted to rear wheels but obviously the disclosure can be applied to any other configuration, e.g. 8 by 4.

The vehicle 2 also includes at least one solar panel (not shown). Typically, the vehicle includes a plurality of solar panels that are installed on the roof of the cab 16, preferably on deflector. The solar panel(s) are inclined to capture the maximum of solar rays. The solar panel(s) is connected to the electric machine 12 and to the supercapacitor 20. As a result, the energy captured by the solar panel(s) can be used for driving the electric machine or recharging supercapacitor.

In the example, the total power of the solar panel(s) is at least of 2.5 kW.

Advantageously, the vehicle 2 can be provided with two set of solar panels oriented in opposite directions (front and rear for example) to ensure that at least one of the two sets of solar panel(s) gets maximum sun rays.

Figure 3:
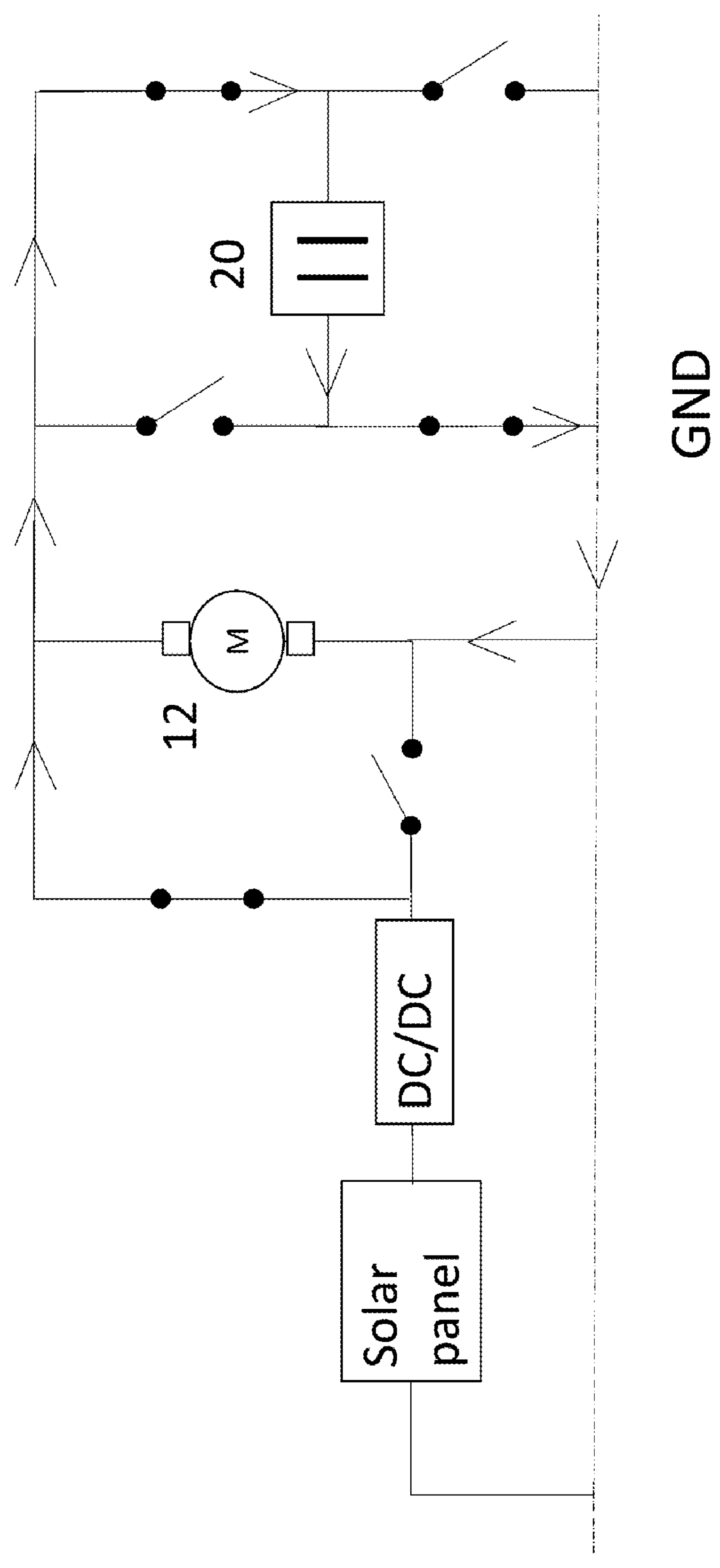
FIG. 3 is a view similar to FIG. 2 representing the electrical architecture of the kinetic energy recovery system in a second driving configuration.

In detail, and as shown on FIGS. 3 and 4, a commutation device is provided to transfer solar power to the electric motor or supercapacitor. In the example, said commutation device is Double Pole Double Throw (DPDT) switch. This switch enables to transfer solar power either to the electric machine, thereby operating as a motor or to the supercapacitor, thereby recharging it. Such switching element is known from one skilled in the art, which is why it is not detailed further herein.

Also, another commutation system is provided for the connection of supercapacitor to the rest of architecture. In the example, a H-bridge (well-known from one specialized in electronics) is used to connect the supercapacitor to the rest of the architecture. The supercapacitor is at the center of the bridge. This H-bridge advantageously enables to reverse the direction of current flowing through the supercapacitor depending on whether it gets charged or discharged.

Advantageously, the vehicle includes a DC/DC converter in order to adapt the output voltage of the solar panel(s) to the input voltage of the electric machine 12 or supercapacitor 20.

An on-board controller, which can also be known as an Electronic Control Unit (ECU), is configured to direct the energy captured by the solar panel(s) either to the electric machine or to the supercapacitor as a function of the torque demand/request. This controller can be the one included into the KERS or another vehicle controller, such as engine ECU.

Torque demand corresponds to the torque to be applied on transmission shaft in order to accelerate or decelerate a vehicle. Typically, in order to accelerate, the driver depresses the throttle, and therefore requests a torque that increases from 0 N·m to some value depending on how far the driver has pushed on acceleration pedal. In such configuration, torque demand to be applied on the drive shaft is positive.

On the contrary, if the driver releases the throttle, then torque request or demand decreases until reaching 0 N·m when accelerator pedal has reached its top position (totally released).

Torque demand gets negative when the driver hit the brake pedal. Indeed, in such configuration, the electric machine to which it is referred to above switches in generator mode. As a result, it generates a magnetic flux that slows down the rotation of drive shaft. A flow of current is generated within stator windings and such energy is stored inside the supercapacitor. As for the throttle, torque demand, in absolute value, increases from 0 N·m to some value depending on how far the driver depressed the brake pedal.

The moments applied on drive shaft are defined according to the following equation:

$$C_m + C_r = J * \frac{dw}{dt}$$

In such equation, Cm represents the torque demand, that can be either positive or negative as a function of the intention of the driver (accelerate or decelerate). Cr represents the resistive torque, which encompasses resistive moments in relation to road adherence, loading, gravity, engine brake, etc.

And torque demand can be decomposed according to the following equation:

$$C_m = C_{ICE} + C_{SC} + C_{solar}$$

Where $C_{ICE}$ is the torque delivered by the prime mover, Csc is the proportion of the torque applied by the electric machine that derives from energy supplied by the supercapacitor and Csolar is the proportion of the torque applied by the electric machine that derives from energy supplied by the solar panel(s). In detail, the discharge of supercapacitor generates a high inflow of current/intensity inside the windings of the stator and the torque Csc to which it is referred to is proportional to that current value. The same applies for the solar panel(s): The energy contained inside the sun rays in converted into a DC current that is sent to the stator windings, thereby applying a torque directly proportional to that current value.

In the example, the throttle to which it is referred to above is an acceleration pedal. However, in a variant shown, it could be any other control element, such as a lever (especially for boats). The same applies for brake control: The brake control element is not necessarily a brake pedal.

Figure 2:
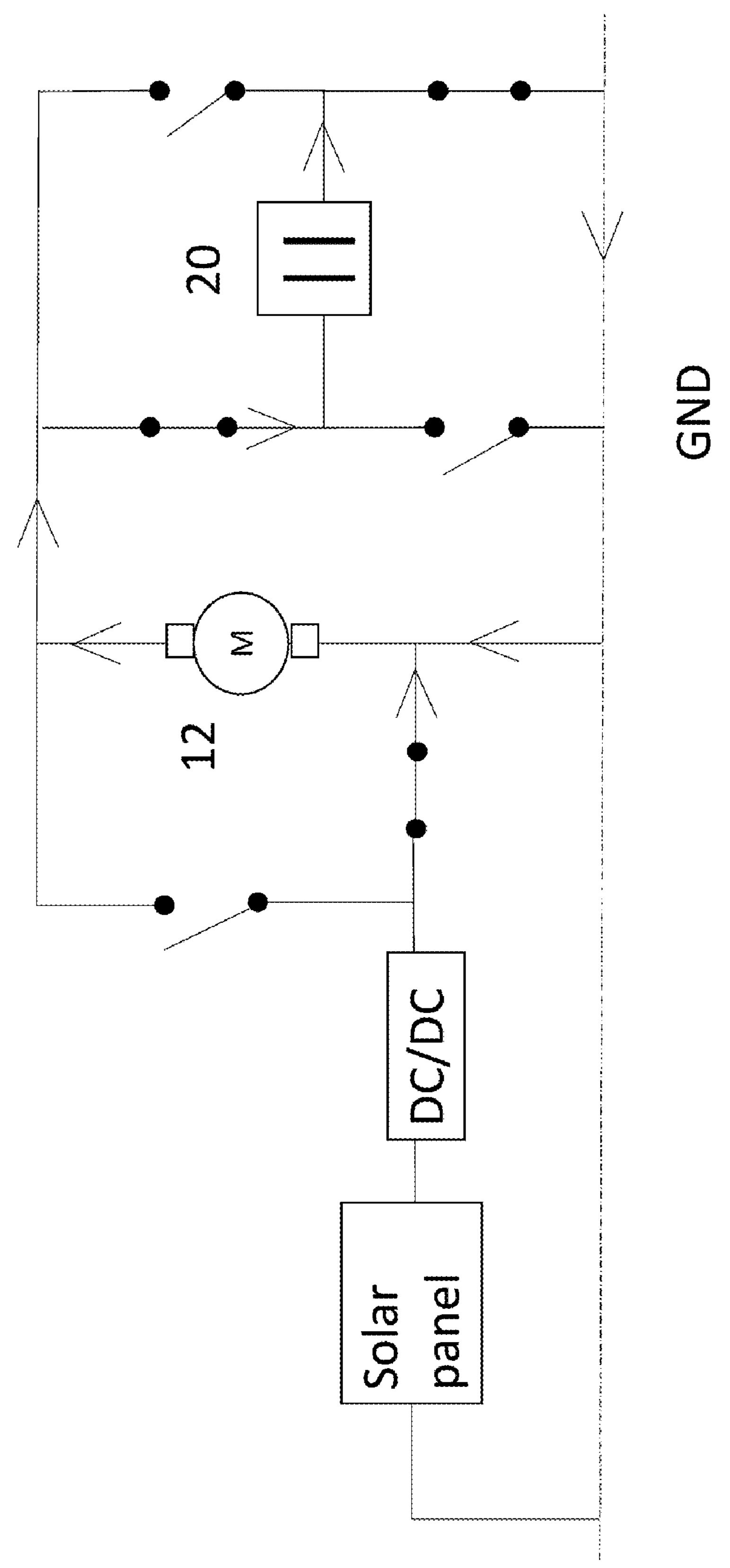
FIG. 2 is a detailed scheme representing an example of the electrical architecture of a kinetic energy recovery system in a first driving configuration.

In the configuration of FIG. 2, the controller directs the energy of solar panel(s) to the electric machine 12, thereby operating as a motor, whenever torque demand is positive (acceleration is requested). In detail, and as it can be seen on FIG. 3, when acceleration is requested, the voltage generated by the solar panel(s) is converted by the DC/DC converter and an electric current is sent through the electric machine, thereby operating it as a motor. As a result, a positive torque is transmitted to drive shaft, in addition to that already provided by the prime mover.

Also, whenever torque demand is positive, supercapacitor gets discharged and send an additional current to stator windings, thereby generating an additional torque on drive shaft. If the addition of the two moments/torques does not meet torque demand, then it is the prime mover that provides the complement.

Arrows on FIG. 2 represent the direction of the flow of current (electrons). In detail, current delivered by the solar panel(s) flows through the electric motor. In addition, current originating from the discharge of supercapacitor also flows through the electric motor, meaning that the amount of current flowing inside the stator windings corresponds to the sum of the current provided by the solar panel(s) and the one delivered by the supercapacitor.

Torque demand is set up either manually through the throttle or automatically by Cruise Control (if the vehicle is equipped with such function).

Advantageously, the controller directs the energy of solar panel(s) to the supercapacitor whenever torque demand is negative or null (deceleration is requested). This is the example/configuration of FIG. 4. In detail, and as it can be seen on FIG. 4, when deceleration is requested, e.g. when the driver releases the throttle and/or depresses the brake pedal, the voltage generated by the solar panel(s) is converted by the DC/DC converter and applied at the input terminals of the supercapacitor, thereby recharging it. To do that, the controller/ECU to which it is referred to above controls the commutation device so as to divert the flow of current towards the supercapacitor, thereby bypassing the electric machine. In parallel, the electric machine switches to generator mode, thereby slowing down the drive shaft and creating electrical energy that is stored inside supercapacitor.

Arrows on FIG. 3 represent the direction of the flow of current (electrons). In detail, current delivered by the solar panel(s) bypasses the electric machine and flows through the supercapacitor, thereby charging it. In addition, current originating from the generator also flows through the supercapacitor, meaning that the amount of current absorbed by the supercapacitor corresponds to the sum of the current provided by the solar panel(s) and the one delivered by the generator.

The configuration in which torque demand is null can be a situation in which the driver has released the throttle but did not hit the brake. It can also correspond to a situation in which, while Cruise control is activated, the vehicle rolls on a downhill slope, thereby eliminating the need of any torque to be applied for keeping the speed constant/steady (cruising conditions). As a result, the action of releasing the throttle is interpreted as a wish or intention of the driver to decelerate.

Also, whenever torque demand is null or negative, supercapacitor gets recharged by recovering the current generated inside the stator windings. In other words, the electric machine operates as a generator whenever torque demand is null or negative, thereby decelerating the vehicle and storing kinetic energy inside the supercapacitor.

The following example consists of a vehicle traveling at a stabilized speed of 90 km/h, wherein the energy delivered by the engine is about 10.75 KW per Liter for a fuel consumption of about 28 L per 100 km. In one hour, about 25.2 Liter of fuel (Diesel) will be burned. This corresponds to a total power of 270.9 KW/h. Then, considering that the solar panel(s) provides 2.5 KW/h, this represents a fuel economy of 1% (more or less), which is not unsignificant.

In summary, according to Example 1: a vehicle is provided, said vehicle comprising:

- a prime mover, such as an internal combustion engine, driving a transmission shaft, a kinetic energy recuperation system, including an electric machine fitted on the transmission shaft and a supercapacitor for recovering the braking energy delivered by the electric machine, at least one solar panel, that is connected to the electric machine and to the supercapacitor;

a controller that is configured to direct the energy captured by the solar panel(s) either to the electric machine or to the supercapacitor as a function of the torque demand on transmission shaft.

Example 2: The vehicle according to Example 1, wherein the controller directs the energy of solar panel(s) to the electric machine, thereby operating as a motor, whenever torque demand is positive.

Example 3: The vehicle according to Example 1 or 2, wherein torque demand is defined either manually by the driver or automatically by Cruise Control.

Example 4: The vehicle according to any previously listed Example, wherein the controller directs the energy of solar panel(s) to the supercapacitor whenever torque demand is negative or null.

Example 5: The vehicle according to any previously listed Example, further including a DC/DC converter to adapt the output voltage of the solar panel(s) to the input voltage of the electric machine or supercapacitor.

Example 6: The vehicle according to any previously listed Example, wherein the electric machine operates as a generator whenever torque demand is null or negative, thereby storing energy inside the supercapacitor.

Example 7: The vehicle according to any previously listed Example, wherein the electric machine operates as a motor whenever torque demand is positive and energy is available inside supercapacitor.

Example 8: The vehicle according to any previously listed Example, wherein the prime mover takes over the electric machine whenever supercapacitor is empty.

Example 9: The vehicle according to any previously listed Example, wherein the prime mover is controlled to compensate for the electric machine in order to reach said torque demand, consisting of the addition of the torque delivered by the electric machine and the torque delivered by prime mover.

Example 10: The vehicle according to any previously listed Example, wherein the electric machine includes a stator portion fixed to the vehicle chassis and a rotor portion that is coaxially fitted around the transmission shaft.

Example 11: The vehicle according to any previously listed Example, wherein the vehicle further comprises a gearbox arranged between prime mover and transmission shaft.

Example 12: The vehicle according to any previously listed Example, wherein the electric machine is a DC motor-generator, e.g. a Brushless DC motor-generator. A technical benefit may be that the electric machine is easy to control, efficient and robust.

Example 13: The vehicle according to any previously listed Example, wherein the transmission shaft to which it is referred to is a propeller shaft extending from a gearbox to a differential of a rear wheel axle.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A vehicle, comprising:

a prime mover, driving a transmission shaft, a kinetic energy recuperation system, including an electric machine fitted on the transmission shaft and a supercapacitor for recovering a braking energy delivered by the electric machine, at least one solar panel, that is connected to the electric machine and to the supercapacitor;

a controller that is configured to direct energy captured by the at least one solar panel either to the electric machine or to the supercapacitor as a function of a torque demand on the transmission shaft.

2. The vehicle according to claim 1, wherein the controller directs the energy of the at least one solar panel to the electric machine, thereby operating as a motor, whenever the torque demand is positive.

3. The vehicle according to claim 2, wherein the torque demand is defined either manually by a driver or automatically by a Cruise Control.

4. The vehicle according to claim 1, wherein the controller directs the energy of the at least one solar panel to the supercapacitor whenever the torque demand is negative or null.

5. The vehicle according to claim 1, which further includes a DC/DC converter to adapt an output voltage of the at least one solar panel to an input voltage of the electric machine or the supercapacitor.

6. The vehicle according to claim 1, wherein the electric machine operates as a generator whenever the torque demand is null or negative, thereby storing energy inside the supercapacitor.

7. The vehicle according to claim 1, wherein the electric machine operates as a motor whenever the torque demand is positive and energy is available inside the supercapacitor.

8. The vehicle according to claim 1, wherein the prime mover takes over for the electric machine whenever the supercapacitor is empty.

9. The vehicle according to claim 1, wherein the prime mover is controlled to compensate for the electric machine in order to reach said torque demand, consisting of an addition of a torque delivered by the electric machine and a torque delivered by the prime mover.

10. The vehicle according to claim 1, wherein the electric machine includes a stator portion fixed to a vehicle chassis and a rotor portion that is coaxially fitted around the transmission shaft.

11. The vehicle according to claim 1, further comprising a gearbox arranged between the prime mover and the transmission shaft.

12. The vehicle according to claim 1, wherein the electric machine is a DC motor-generator.

13. The vehicle according to claim 1, wherein the transmission shaft is a propeller shaft extending from a gearbox to a differential of a rear wheel axle.

* * * * *